July 14, 1964

E. M. ROBERTS 3,140,993

EXTENDED CORRELATION TIME VANADIUM ANALYSIS

Filed April 21, 1961

EDWIN M. ROBERTS
INVENTOR.

BY Sidney G. Johnson

July 14, 1964 E. M. ROBERTS 3,140,993
EXTENDED CORRELATION TIME VANADIUM ANALYSIS
Filed April 21, 1961 2 Sheets-Sheet 2

EDWIN M. ROBERTS
INVENTOR.

BY

United States Patent Office 3,140,993
Patented July 14, 1964

3,140,993
EXTENDED CORRELATION TIME VANADIUM ANALYSIS
Edwin M. Roberts, Dallas, Tex., assignor to Socony Mobil Oil Company, Inc., a corporation of New York
Filed Apr. 21, 1961, Ser. No. 125,291
3 Claims. (Cl. 208—251)

This invention relates to the analysis of hydrocarbons for trace quantities of paramagnetic vanadium. In a more specific aspect the invention relates to vanadium analysis in a system in which molecular correlation time of a given sample is increased to the region approaching infinite time.

In nondestructive analysis of hydrocarbons it has been found advantageous to use electron spin resonance techniques wherein a given sample of a hydrocarbon is confined in a resonant microwave cavity in which there is also established a substantially uniform magnetic field of relatively high intensity. Such a system may be so adjusted that, absent any loss elements within the cavity, a constant Q of the cavity is maintained. The introduction of paramagnetic substance into the cavity under certain conditions may then produce an unbalance giving rise to an output signal dependent upon the absorption of energy by the sample. Such output signal may be representative of the concentration of a transition element such as vanadium in the sample.

Trace quantities of transition elements may be detected and quantitatively measured by electron spin resonance where two conditions are met. The first of these conditions is that unpaired electrons exist for the particular element of interest. The second condition is the absence of electron resonance signal interference from other paramagnetic species. Two species which generally satisfy these conditions in both crude oils and in reservoir rocks in which crude oils may be found are paramagnetic vanadium and free radicals.

It is desirable to determine concentration of vanadium in hydrocarbons such as crude oils for several reasons. For example, vanadium in substantial quantities may inhibit processes such as catalytic cracking or other treatment. The concentration in such cases not only should be known but preferably should be controlled.

A problem encountered in the determination of concentration of vanadium is that a resultant signal in an electron spin resonance system is dependent upon the molecular correlation time. Molecular correlation time is a property of a given molecule which is related to the time required for such molecule to make a complete rotation. Thus, the correlation time is dependent upon the molecular size and upon viscosity.

In order to overcome the undesirable effects of the variable molecular correlation time of a trace element in a sample, applicant has provided a method utilizing electron spin resonance in which a sample is confined in a test zone. There is then established in this zone a magnetic field which is substantially homogeneous. The molecular correlation time of the sample is then increased to the region approaching infinity and while maintained in such state, the test zone is irradiated with electromagnetic waves. The absorption of electromagnetic radiation in the zone is then detected and there is registered a resultant function dependent upon the concentration of vanadium present in the sample.

In a more specific aspect of the invention there is provided a system for measuring the vanadium concentration by electron spin resonance in which a resonant cavity is provided with ports through which a sample may be introduced and is suitably coupled to a microwave electromagnetic energy source for resonance in said cavity. In accordance with the present invention there is provided structure forming a flow channel passing through said cavity and communicating with said ports and adapted to envelop the confined sample. Means are then provided for directing a flow of cooled gas over said sample and through said channel to extend the molecular correlation time of the sample to the region approaching infinity. The absorption in the cavity by reason of the presence of the sample is then measured by means of electron spin resonance where microwave energy is modified by the presence of the sample.

For a more complete understanding of the present invention and for further objects and advantages thereof, reference may now be had to the following description taken in conjunction with the accompanying drawings in which.

This invention is applicable to systems such as the Electron Paramagnetic Resonance Spectrometer described by Varion Associates, 611 Hansen Way, Palo Alto, California, in their catalog, identified as Model V4500. Such a system is shown partially in block form in FIG. 1.

Figure 1:
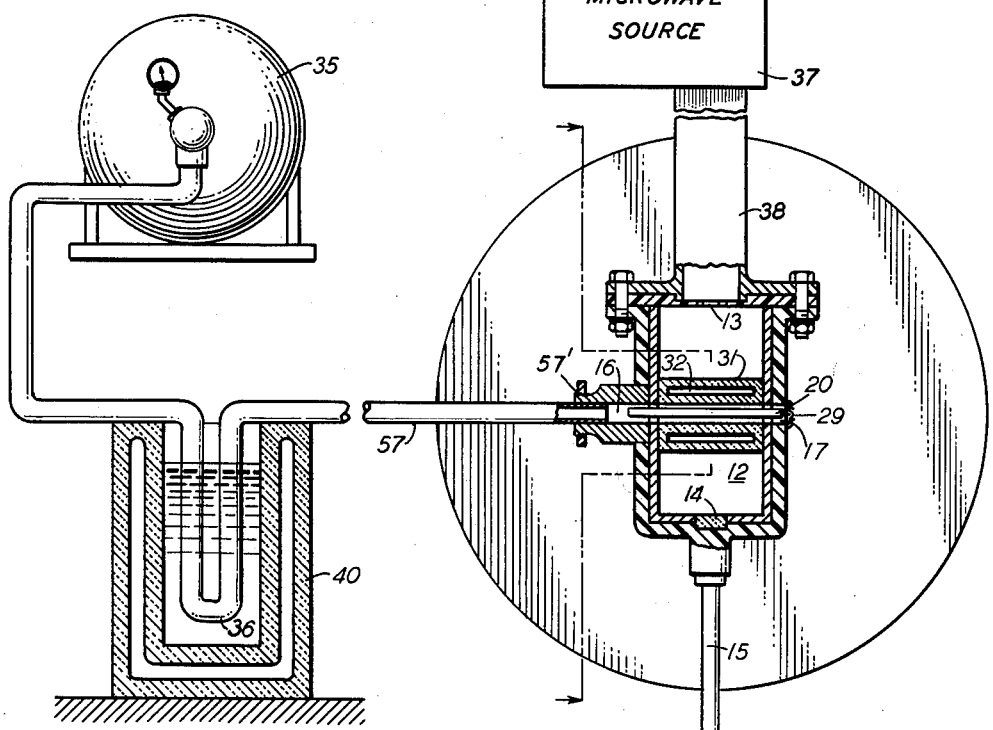
FIG. 1 is a schematic diagram partly in section illustrating the invention.
Figure 2:
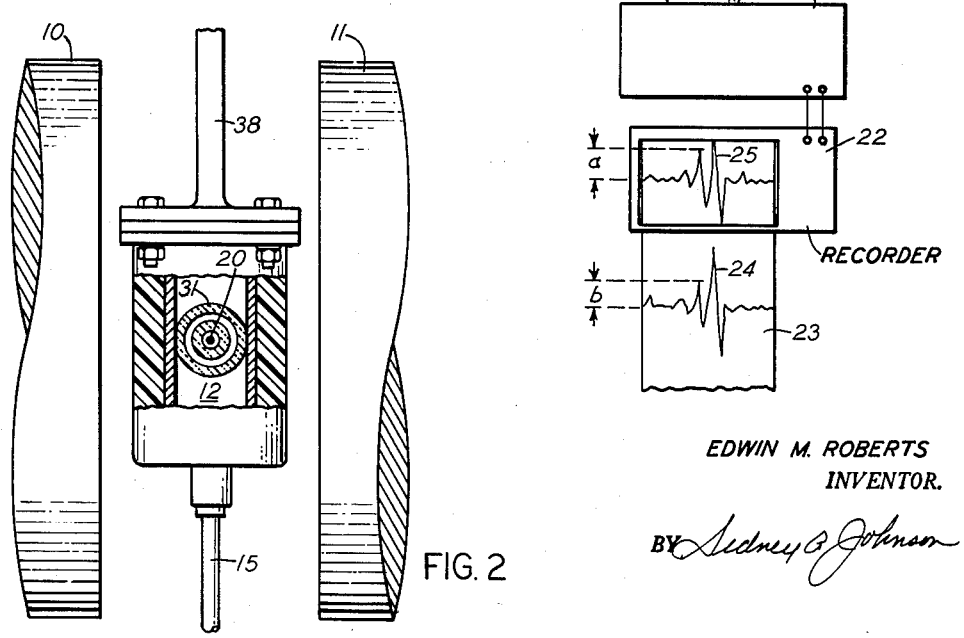
FIG. 2 is a sectional view taken along line 2—2 of FIG. 1.

A substantially homogeneous magnetic field of relatively high intensity threads an air gap between a first pole face 10, FIGS. 1 and 2, and a second pole face 11, parallel to and spaced from the pole face 10. A microwave chamber 12 positioned in the air gap is shown partially in a section. The microwave chamber 12 is of rectangular polyhedron shape formed from metal of high conductivity. Microwaves are introduced by way of an iris 13 at one end of the chamber. At the end of the chamber opposite iris 13 there is situated a crystal 14 which is connected by way of a coaxial line 15 to a suitable measuring instrument 21.

The system illustrated in FIG. 1 and constructed in accordance with the above-identified Varian publication may be controlled to identify or to determine the presence of a given molecule within the chamber. The relationships between the factors affecting such determinations may be expressed in the following form:

$$\frac{w}{H} \neq \frac{gu_0}{h} \qquad (1)$$

where $h$ = Planck's constant,
$w$ = frequency of the microwaves driving the cavity,
$H$ = the magnetic field strength,
$g$ = the spectroscopic splitting factor of the material inside the chamber, and
$u_0$ = Bohr's magneton which may be expressed in the following form $$u_0 = \frac{eh}{4\pi mc}$$

where:

$e$ is the electronic charge,
$m$ is the electronic mass, and
$c$ is the velocity of light.

When the condition expressed by Equation 1 is satisfied, nothing is observed. That is to say, no signal is derived from the crystal 14. However, when there is absorption of microwave energy by the paramagnetic species in the cavity, the following expression is satisfied:

$$\frac{w}{H} = \frac{gu_0}{h} \qquad (2)$$

From Equations 1 and 2 it will be noted that all of the factors except $g$ are independent of the material in the cavity. The factor $g$ is a property of the material itself. Thus, the resonance condition may be satisfied or may not be satisfied depending upon the character of the materials introduced into the cavity and upon the setting of the controllable parameters such as the frequency of the microwave energy and the magnitude of the polarizing field. In practice, generally speaking the frequency of the signal $w$ from the microwave source is maintained constant. For a given measurement the magnetic field H is varied according to a preset function from a first value H' to a second and different function H'' such that the sample introduced into the chamber 12 passes through the resonance condition.

The chamber 12 is provided with a pair of opposed side ports 16 and 17. A sample to be measured is confined in a relatively thin, accurately dimensioned holder 20 which is inserted into the cavity. The sample of hydrocarbon material containing trace amounts of vanadium will so absorb microwave energy as the magnetic field is swept through the preset limits above noted that a spectral type signal will be present at the output of the crystal 14.

The output signal from crystal 14 is transmitted by way of cable 15 to a measuring instrument 21. The resultant spectrum of resonance signals is converted into a suitable voltage. Such voltage is processed to yield information indicative of concentration.

For the purpose of aiding an understanding of the invention, the voltages have been illustrated as they are recorded by recorder 22. Two representative spectra are illustrated on the chart 23. The first waveform 24 may be considered to represent the resonance spectra of a known standard. The second waveform 25 may be considered to represent the resonance spectra of an unknown such as a sample of crude oil. The principal resonance peaks due to vanadium are represented by the peaks having amplitudes $a$ and $b$.

Figure 3:
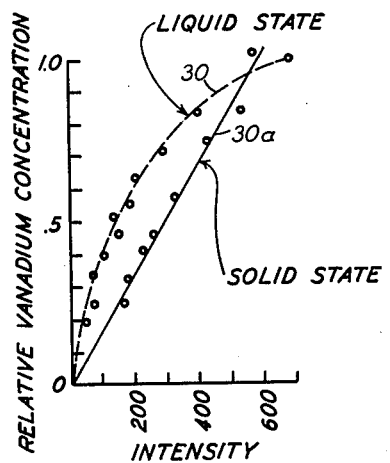
FIG. 3 is a graph of data obtained through use of the system of FIG. 1.

It has been proposed to measure the concentration of vanadium even in trace amounts in hydrocarbons such as crude oils by the system thus far described where a known standard sample is first placed in the cavity and then an unknown. Peaks in the resultant spectra are compared in order to determine the concentration of vanadium in the sample. Such measurements have been subject to errors of the type graphically portrayed in FIG. 3, which is a plot of the intensity or height of a given peak in a given spectrum from crystal 14 as a function of relative vanadium concentration. When in the liquid state, a curve 30 is obtained and is shown as a dotted line. Nonlinearity present in curve 30 is most undesirable since it is necessary to compare a known spectrum and an unknown spectrum. The molecular correlation time is dependent upon molecular size. The size of the known molecule, i.e., in the standard, may differ substantially from the size of the molecule in the "unknown" or test sample. This being the case, any comparison between peak heights in two spectra from such samples would be subject to substantial error.

In order to overcome this problem there is provided a means for increasing the molecular correlation time substantially. Preferably molecular correlation time is extended to a region approaching infinity. This is accomplished by passing an extremely cold stream of a gas over sample 20 in the measuring environment in such a manner as to leave the cavity itself substantially unaffected and to so increase the viscosity of the sample that it is near solid. In the solid state the molecular correlation time is infinite. This is accomplished by securing within the cavity 12 a coaxial tube structure 31 which has a cylindrical dead air space 32 therein. The ends of tube 31 are secured to the walls of the cavity adjacent the apertures 15 and 16 to prevent leakage of coolant into the cavity itself. Cool gas is derived from a pressurized gas source 35. Preferably nitrogen gas is employed under pressure. Source 35 is connected by way of a U-tube 36 and a tubing 57 to a fitting 57' which in turn is secured to the wall of chamber 12. The U-tube 36 is immersed in a container 40 commonly known as a Dewar flask. Container 40 is provided with a coolant such as liquid nitrogen which preferably is maintained at a constant level. The nitrogen gas from source 35 is cooled as it passes through the U-section 36 and then travels through the sample bearing passage in chamber 12. The sample 20 can be maintained in position by any suitable restraining means such as screen 29 which covers the downstream mouth of the passage.

The structure of the insulating insert 31 may further be understood by reference to FIG. 2 where the coaxial relationships are clearly shown. The insulating structure was formed from cylinders of synthetic materials of nonparamagnetic properties and was such that the dielectric loss characteristics of the chamber 12 were affected but slightly by the introduction of the unit 31 therein. Thus the presence or absence of the sample 20 determines microwave energy absorption. It will be noted that a microwave source 37, FIG. 1, is connected by way of a wave guide 38 to the upper end of the chamber 12 by way of the tuning iris 13. It will be noted that the maximum diameter of the insulating cylinder 31 conforms with the smallest dimension of the chamber 12. The ends of the element 31 are adhesively secured to the walls of the chamber against which they abut by a suitable low dielectric loss adhesive. So constructed, the device has a minimum of dielectric loss with an optimum amount of heat insulation.

In one embodiment sample tubes of high precision were used where the dimensions of the tubes were 0.190±.0003" outside diameter and 0.15"±.0015" inside diameter. In this system the sample volume was held to a predetermined amount within limits of the order of 0.3%.

The use of precision sample tubes was found to be highly desirable to introduce into the cavity successive samples substantially identical in size, thus minimizing the variables that otherwise might be introduced by varying volume as well as the molecular character of the samples.

Samples of the size above discussed were found to be rendered substantially solidified by proper adjustment of the rate of flow of cooled gas thereover within a relatively short interval, of the order of about two minutes. While liquid nitrogen has been found to be suitable, other diamagnetic gases such as helium and argon may be employed.

The standards employed for determining the vanadium content may be selected from a number of possibilities. One standard which has been found to be satisfactory is vanadyl deuteroporphyrin IX dimethyl ester, which is characterized by relatively small molecular structure, particularly in comparison with the size of vanadium-bearing molecules and the colloidal structures found in crude oil. Since the molecular size has such a bearing on the intensity of a given peak in the electron spin resonance spectrum, a comparison must be made which is independent of molecular size. The straight line 30a represents the variation in intensity of a given peak in the spectrum as a function of relative vanadium concentration where the sample is such that the molecular correlation time is approaching infinity.

Figure 4:
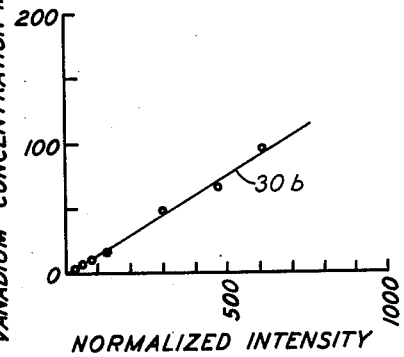
FIG. 4 is a plot of similar data from a known standard.

When the analysis of a substance is performed by the comparison of data from an unknown with data obtained from a standard, the linear relationship between the observable quantity, that is, the height of a selected peak in the spectrum, and concentration of the trace element in provided by the present invention. In verifying the invention, a plurality of standard samples of a vanadyl deuteroporphyrin IX dimethyl ester were prepared corresponding to 97.0, 70.4, 50.3, 32.0, 20.0, 10.0, 5.0 and 1.95 parts per million of vanadium. The electron spin resonance intensity of the largest of the sixteen derivative peaks in the resultant spectra was obtained at low temperatures for each sample and plotted as curve 30b, FIG. 4, versus the concentration in parts per million of vanadium. In this case as with the unknown represented by the curve 30a of FIG. 3, the straight line curve 30b of FIG. 4 has the linearity necessary for reliable comparison as between an unknown and a known sample.

Figure 5:
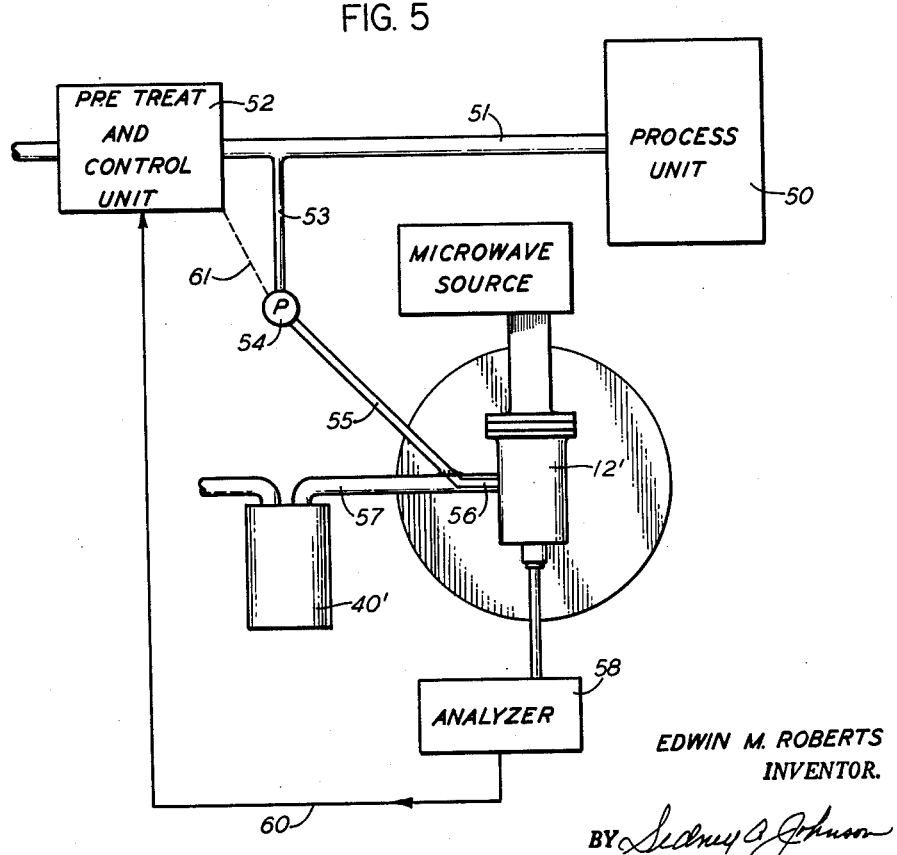
FIG. 5 illustrates a modification of the invention.

Referring now to FIG. 5, there is illustrated an application of measurements performed in accordance with the present invention wherein a process unit 50 receives crude oil or an intermediate product other than crude oil by way of a pipeline 51. Process unit 50 may be understood to be sensitive to unusually high concentrations of vanadium. A treating unit 52 is provided in the line 51 upstream of the process unit and is adapted to pretreat and control the amount of the undesirable impurities flowing in the liquids to the process unit. A sample line 53 is tapped onto the line 51 between the prettreat unit 52 and the process unit 50. A pump 54 serves to deliver the sample fluid by way of line 55 into a sample channel 56 extending through the chamber 12'. As in the case of FIGS. 1 and 2, a coolant gas is provided under flow from a source, not shown in FIG. 5, but traveling by way of the tube 57 so that the sample in the chamber 12' will be substantially solidified for measurement of the electron spin resonances therein. The output signal from the chamber 12' is applied to an analyzer 58 and an output control signal is derived therefrom which is applied by way of a signal channel 60 to the control input terminal of the pretreat and control unit 52. If the characteristics of the signal due to undesirable element concentration in the pipeline 51 becomes excessive, the signal on channel 60 may be so applied that above a given threshold it will actuate the pretreat and control unit to modify the contaminant concentration and reduce it to a level acceptable to the process unit. As indicated by the dotted line 61, the pump may be operated under the control of the unit 52 and may preferably be operated intermittently rather than continuously so that spectra undisturbed by any sample motion may be successively obtained for application to the analyzer 58.

Thus from the foregoing it will be seen that there is provided an electron spin resonance system in which a microwave chamber is adapted to be irradiated with electromagnetic energy. A conduit extending through the chamber is formed by a low loss dielectric material. Means are provided for confining an elongated, cylindrical sample in the conduit and for cooling the sample so that the molecular correlation time is extended to the range of about infinity so that variations due to the same will be eliminated. Means are then provided for measuring the absorption of microwave energy in the solidified sample.

It will further be appreciated that the method may be carried out by placing a sample in the system after immersion in a coolant for a length of time sufficient to solidify the sample. The system, previously readied for measurement, may then be energized to carry out the measurement while the sample remains in solidified form.

Thus the method may be carried out at least in part by hand and involves the steps of establishing a magnetic field in a testing zone where the magnetic field is substantially homogeneous, increasing the molecular correlation time of a sample to the region approaching infinite time and confining the sample in the testing zone. Thereafter the zone is irradiated with electromagnetic waves to induce electron spin resonances in the sample and variations in absorption of electromagnetic energy in the zone are then sensed to produce a signal independent of molecular correlation time.

Having described the invention in connection with certain specific embodiments thereof, it is to be understood that further modifications may now suggest themselves to those skilled in the art and it is intended to cover such modifications as fall within the scope of the appended claims.

What is claimed is:

1. In processing hydrocarbons in a system susceptible to vanadium poisoning the method which comprises:
   (a) sampling the stream of feed stock leading to said system,
   (b) confining each sample in a test zone,
   (c) establishing a polarizing magnetic field in said test zone,
   (d) substantially solidifying each sample in said test zone to extend the molecular correlation time thereof to the region of infinity,
   (e) irradiating each solidified sample with electromagnetic waves to induce electron spin resonances in each said sample,
   (f) sensing variations in absorption in successive samples in said test zone to produce vanadium dependent signals independent of molecular correlation time, and
   (g) modifying the concentration of vanadium in said feed stock in response to a characteristic of said signals attributable to the presence of vanadium in said feed stock.

2. The method of analysis for paramagnetic vanadium concentration in a feed stream of hydrocarbons which comprises:
   (a) flowing a sample fraction of said stream through a test zone,
   (b) establishing a magnetic field in said zone which is substantially homogeneous,
   (c) flowing a cold diamagnetic gas over the portion of said sample stream in said zone to increase the molecular correlation time of said sample stream in said magnetic field to the region of about infinite time,
   (d) irradiating said sample stream in said zone with electromagnetic microwaves to induce electron spin resonance in said sample, and
   (e) sensing variations in vanadium dependent resonance signals from said sample due to variations in concentration of vanadium.

3. The method of claim 2 in which the flow of said sample stream is intermittent.

References Cited in the file of this patent

UNITED STATES PATENTS

| 2,888,638 | Nelson | May 26, 1959 |
| 2,955,252 | Williams | Oct. 4, 1960 |

FOREIGN PATENTS

| 810,596 | Great Britain | Mar. 18, 1959 |

OTHER REFERENCES

O'Reilly: Journal of Chemical Physics, vol. 29, No. 5, November 1958, pp. 1188–1189.

Dillon et al: The Review of Scientific Instruments, vol. 30, No. 7, July 1959, pp. 559–561 incl.

Varian Associates, Instrument Division, Electron Paramagnetic Resonance EPR Spectrometer Data Sheet, V–4500 Spectrometer. 4 pp.

Tucker: Physical Review, vol. 112, No. 3, November 1, 1958, pp. 725 to 731 incl.

Hausser: Zeitschrift für Naturforschung, vol. 14A, No. 3, April 1959, pp. 425 to 436 incl.

Piette et al.: Journal of Chemical Physics, vol. 32, No. 4, April 1960, pp. 1107–1111 incl.